(12) United States Patent
Sekii

(10) Patent No.: US 6,301,202 B1
(45) Date of Patent: Oct. 9, 2001

(54) REPRODUCTION APPARATUS AND REPRODUCTION METHOD

(75) Inventor: Yasuaki Sekii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,886

(22) Filed: Sep. 17, 1999

(30) Foreign Application Priority Data

Sep. 18, 1998 (JP) .................................................. 10-265279

(51) Int. Cl.[7] .................................................. G11B 17/22
(52) U.S. Cl. .................................................. 369/32
(58) Field of Search .................................... 369/32, 275.3, 369/47.1, 47.15, 47.16, 47.31, 53.2

(56) References Cited

U.S. PATENT DOCUMENTS

| | | | |
|---|---|---|---|
| 5,570,340 | * 10/1996 | Lee et al. | 369/32 |
| 5,594,709 | * 1/1997 | Nagano et al. | 369/32 |
| 5,754,521 | * 5/1998 | Yokota | 369/32 |
| 5,768,252 | * 6/1998 | Yokota | 369/32 |

* cited by examiner

*Primary Examiner*—Tan Dinh
(74) *Attorney, Agent, or Firm*—Jay H. Maioli

(57) ABSTRACT

A reproduction apparatus and a corresponding reproduction method for reproducing data from a recording medium that has a program area provided in advance with absolute addresses and a controlled area storing the absolute start address of each program recorded on it in correspondence to the program number thereof.

14 Claims, 17 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 0 | CONTROL | | CHANNEL NUMBER | | 0 | 0 | CATEGORY CODE | | | | | | | |
| 16 | SOURCE NUMBER | | | | | | | | fs | | | CLOCK ACCURACY | | | |
| 32 | | | | | | | | | | | | | | | |
| 48 | | | | | | | | | | | | | | | |
| 64 | | | | | | | | | | | | | | | |
| 80 | | | | | | | | | | | | | | | |
| 96 | | | | | | | | | | | | | | | |
| 112 | | | | | | | | | | | | | | | |
| 128 | | | | | | | | | | | | | | | |
| 144 | | | | | | | | | | | | | | | |
| 160 | | | | | | | | | | | | | | | |
| 176 | | | | | | | | | | | | | | | |

FIG.7

| | 0 | 1 | 2 | 3 | 4 | 5 | 6 | 7 | 8 | 9 | 10 | 11 |
|---|---|---|---|---|---|---|---|---|---|---|---|---|
| 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 |
| 24 | 1 | Q1 | R1 | S1 | T1 | U1 | V1 | W1 | 0 | 0 | 0 | 0 |
| 36 | 1 | Q2 | R2 | S2 | T2 | U2 | V2 | W2 | 0 | 0 | 0 | 0 |
| . | . | . | . | . | . | . | . | . | . | . | . | . |
| 1164 | 1 | Q96 | R96 | S96 | T96 | U96 | V96 | W96 | 0 | 0 | 0 | 0 |
| 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 |
| 24 | 1 | Q1 | R1 | S1 | T1 | U1 | V1 | W1 | 1 | Q2 | R2 | T2 |
| 36 | T2 | U2 | V2 | W2 | 0 | 0 | 0 | 0 | 0 | 0 | 0 | 0 |
| 48 | 1 | Q3 | R3 | S3 | T3 | U3 | V3 | W3 | 0 | 0 | 0 | 0 |
| 60 | 0 | 0 | 0 | 0 | 1 | Q4 | R4 | S4 | T4 | U4 | V4 | W4 |
| 72 | 1 | Q5 | R5 | S5 | T5 | U5 | V5 | W5 | 0 | 0 | 0 | 0 |
| . | . | . | . | . | . | . | . | . | . | . | . | . |

FIG.8

| No. | PREAMBLE SYNC | AUX | AUDIO SAMPLES | | MSB | V | U | C | P |
|---|---|---|---|---|---|---|---|---|---|
| 1 | B | 0000 | 0000 | XXXX XXXX XXXX | XXXX | 0 | 0 | C1L | P |
| 2 | W | 0000 | 0000 | XXXX XXXX XXXX | XXXX | 0 | 0 | C1R | P |
| 3 | M | 0000 | 0000 | XXXX XXXX XXXX | XXXX | 0 | 0 | C2L | P |
| 4 | W | 0000 | 0000 | XXXX XXXX XXXX | XXXX | 0 | 0 | C2R | P |
| 5 | M | 0000 | 0000 | XXXX XXXX XXXX | XXXX | 0 | 0 | C3L | P |
| 6 | W | 0000 | 0000 | XXXX XXXX XXXX | XXXX | 0 | 0 | C3R | P |
| 7 | M | 0000 | 0000 | XXXX XXXX XXXX | XXXX | 0 | 0 | C4L | P |
| 8 | W | 0000 | 0000 | XXXX XXXX XXXX | XXXX | 0 | 0 | C4R | P |
| 9 | M | 0000 | 0000 | XXXX XXXX XXXX | XXXX | 0 | 0 | C5L | P |
| 10 | W | 0000 | 0000 | XXXX XXXX XXXX | XXXX | 0 | 0 | C5R | P |
| 11 | M | 0000 | 0000 | XXXX XXXX XXXX | XXXX | 0 | 0 | C6L | P |
| 12 | W | 0000 | 0000 | XXXX XXXX XXXX | XXXX | 0 | 0 | C6R | P |
| 13 | B | 0000 | 0000 | XXXX XXXX XXXX | XXXX | 0 | 0 | C7L | P |
| 14 | B | 0000 | 0000 | XXXX XXXX XXXX | XXXX | 0 | 0 | C7R | P |
| 15 | B | 0000 | 0000 | XXXX XXXX XXXX | XXXX | 0 | 0 | C8L | P |
| 16 | B | 0000 | 0000 | XXXX XXXX XXXX | XXXX | 0 | 0 | C8R | P |
| 17 | B | 0000 | 0000 | XXXX XXXX XXXX | XXXX | 0 | 0 | C9L | P |
| 18 | B | 0000 | 0000 | XXXX XXXX XXXX | XXXX | 0 | 0 | C9R | P |
| 19 | B | 0000 | 0000 | XXXX XXXX XXXX | XXXX | 0 | 0 | C10L | P |
| 20 | B | 0000 | 0000 | XXXX XXXX XXXX | XXXX | 0 | 0 | C10R | P |
| 21 | B | 0000 | 0000 | XXXX XXXX XXXX | XXXX | 0 | 0 | C11L | P |
| 22 | B | 0000 | 0000 | XXXX XXXX XXXX | XXXX | 0 | 0 | C11R | P |
| 23 | B | 0000 | 0000 | XXXX XXXX XXXX | XXXX | 0 | 0 | C12L | P |
| 24 | B | 0000 | 0000 | XXXX XXXX XXXX | XXXX | 0 | 0 | C12R | P |

FIG.9

| No. | PREAMBLE SYNC | AUX | AUDIO SAMPLES | | MSB | V | U | C | P |
|---|---|---|---|---|---|---|---|---|---|
| 25 | M | 0000 | 0000 | XXXX | XXXX | 0 | 1 | C13L | P |
| 26 | W | 0000 | 0000 | XXXX | XXXX | 0 | Q1 | C13R | P |
| 27 | M | 0000 | 0000 | XXXX | XXXX | 0 | R1 | C14L | P |
| 28 | W | 0000 | 0000 | XXXX | XXXX | 0 | S1 | C14R | P |
| 29 | M | 0000 | 0000 | XXXX | XXXX | 0 | T1 | C15L | P |
| 30 | W | 0000 | 0000 | XXXX | XXXX | 0 | U1 | C15R | P |
| 31 | M | 0000 | 0000 | XXXX | XXXX | 0 | V1 | C16L | P |
| 32 | W | 0000 | 0000 | XXXX | XXXX | 0 | W1 | C16R | P |
| 33 | M | 0000 | 0000 | XXXX | XXXX | 0 | 0 | C17L | P |
| 34 | W | 0000 | 0000 | XXXX | XXXX | 0 | 0 | C17R | P |
| 35 | M | 0000 | 0000 | XXXX | XXXX | 0 | 0 | C18L | P |
| 36 | W | 0000 | 0000 | XXXX | XXXX | 0 | 0 | C18R | P |
| 37 | M | 0000 | 0000 | XXXX | XXXX | 0 | 1 | C19L | P |
| 38 | W | 0000 | 0000 | XXXX | XXXX | 0 | Q2 | C19R | P |
| 39 | M | 0000 | 0000 | XXXX | XXXX | 0 | R2 | C20L | P |
| 40 | W | 0000 | 0000 | XXXX | XXXX | 0 | S2 | C20R | P |
| 41 | M | 0000 | 0000 | XXXX | XXXX | 0 | T2 | C21L | P |
| 42 | W | 0000 | 0000 | XXXX | XXXX | 0 | U2 | C21R | P |
| 43 | M | 0000 | 0000 | XXXX | XXXX | 0 | V2 | C22L | P |
| 44 | W | 0000 | 0000 | XXXX | XXXX | 0 | W2 | C22R | P |
| 45 | M | 0000 | 0000 | XXXX | XXXX | 0 | 0 | C23L | P |
| 46 | W | 0000 | 0000 | XXXX | XXXX | 0 | 0 | C23R | P |
| 47 | M | 0000 | 0000 | XXXX | XXXX | 0 | 0 | C24L | P |
| 48 | W | 0000 | 0000 | XXXX | XXXX | 0 | 0 | C24R | P |

FIG.10

```
Track_List_2 ( ) {                          #bytes  format         value
    Track_List_2 Signature                    8     string         "SACDTRL2"
    for (ton=1;ton<=N_Tracks;ton++)
    {
        Track_Start_Time_Code [ton]           3     Time_Code
        reserved                              1     Uint8          0
    }
    Reserved                            Until 1028  Uint8          0
    for (ton=1;ton<=N_Tracks;ton++)
    {
        Track_Time_Length [ton]               3     Time_Code
        Track_Flags [ton]                     1     Track_Flags
    }
    Reserved                            Until 2048  Uint8          0
}
```

FIG.12

```
Index_List ( ) {                        #bytes    format     value
    Index_List_Signature                   8      string     "SACD_Ind"
    for (ton=1;ton<=N_Tracks;ton++)
    {
        Index_Ptr [ton]                    2      Uint16
    }
    Reserved                            Until 524  Uint8       0
    for (ton=1;ton<=N_Tracks;ton++)
        if (Index_Ptr [ton]>0)
        {
            N_Stored_Indexes [ton]         1      Uint8      1..255
            for (x=1;x<=N_Stored_Indexes [ton];x++)
            {
                Index_Start_TC [ton] [x+1] 3      Time_Code
            }
        }
    Reserved                            Until eos  Uint8       0
}
```

FIG.13

|  | #bytes | format | value |
|---|---|---|---|
| Audio_Header () { | | | |
|   N_Packs | 3 | Uint3 | 1..7 |
|   N_Frame_Starts | 3 | Uint3 | 1..7 |
|   Reserved | 2 | | 0 |
|   for (p=1;p<=N_Packets;p++) | | | |
|     Packet_Info () [p] | 16 | Packet_Info | |
|   for (f=1;f<=N_Frame_Starts;f++) | | | |
|     Frame_Info () [f] | 48 | Frame/Info | |
| } | | | |

FIG.14

|  | #bytes | format | value |
|---|---|---|---|
| Frame_Info ( ) [f] {<br>  Time_Code | 24 | Time_Code |  |
|   if (Frame_Format==0/*==LLC*/)<br>  { |  |  |  |
|     Reserved | 2 | Uint8 | 0 |
|     N/Sector [f] | 4 | Uint4 | 0 |
|     Buffer_Occupancy [f] | 18 | Uint18 | 0 |
|   }<br>} |  |  |  |

FIG. 15

| AREA TOC | TRACK LIST2 | | | |
|---|---|---|---|---|
| | TRACK START TIME CODE | | INDEX LIST | INDEX START TIME CODE |
| | TN01 | 0M10S00F (TC₁) | INDEX 2 | 2M10S00F |
| | | | INDEX 3 | 3M10S00F |
| | | | .... | .... |
| | | | INDEX M | 4M10S00F |
| | TN02 | 5M30S00F (TC₂) | INDEX 2 | 6M10S00F |
| | | | INDEX 3 | 8M10S00F |
| | | | .... | .... |
| | TN03 | 10M20S00F (TC₃) | INDEX 2 | 12M30S00F |
| | | | .... | .... |
| | TN0N | (TC_N) | ... | ... |

FIG.16

REPRODUCTION APPARATUS AND REPRODUCTION METHOD

BACKGROUND OF THE INVENTION

1. Field of the Invention

This invention relates to a reproduction apparatus and a reproduction method for reproducing data from a recording medium comprising a program area provided in advance with absolute addresses and a controlled area storing the absolute start address of each program recorded on it in correspondence to the program number thereof.

2. Related Background Art

The digital audio interface output of known compact disk (CD) players is adapted to produce, in addition to digital audio data, channel status data including a category code for identifying the CD category of the CD disk to be played and user data comprising Q codes, each including a track number and the elapsed time of a piece of music on the track.

On the other hand, many known digital recording apparatus using a digital audio tape (DAT) or a mini-disk (MD) as recording medium are designed to automatically record start IDs and track numbers on the recording medium for a great convenience of the user on the basis of the CD category identified by decoding the channel status data and the sub-data including the track numbers and the elapsed time of each piece of music recorded on the CD to be replayed as detected by decoding the Q code of the user data.

Meanwhile, in recent years, standards for optical disks that are different from known CDs and adapted to record high speed 1-bit digital audio signals for music have been proposed. Audio data addressed by the proposed standards are 1-bit audio signals obtained by subjecting corresponding analog audio signals to a delta-sigma ($\Delta E$) modulation process. A 1-bit audio signal is sampled with a very high sampling frequency that is 64 times as high as the sampling frequency of 44.1 KHz of ordinary CDs. The signal is expressed in terms of a very high sampling frequency and a data word length with a very small number of quantization bits and hence characterized by a wide transmission frequency band. Additionally, due to the $\Delta E$ modulation, it can secure a wide dynamic range in the audio band that is a low frequency band relative to the over-sampling frequency that is 64 times as high as the sampling frequency of ordinary CDs.

An optical disk deals with high speed 1-bit audio signals conforming to the proposed standards for new digital audio signals and shows audio characteristics by far more excellent than those of known CDs. However, a recording system totally different from that of known CDs has to be used for it and hence is not compatible with known CDs in terms of information on the track numbers and the elapsed time of each piece of music as contained in the sub-data as well as other data.

On the other hand, disk replaying apparatus that can replay music from both an ordinary CD and a disk of a new type carrying high speed 1-bit audio signals are known. The user of such an apparatus may want to get information on the audio signals recorded on the CD and also on the audio signals recorded on the new type disk particularly in terms of the serial number of each recorded piece of music and the elapsed time from the start. However, to date, such information can not be displayed for the disks of the two different types by means of a single display system.

SUMMARY OF THE INVENTION

In view of the above circumstances, it is therefore the object of the present invention to provide a reproduction apparatus and a reproduction method that can transform and generate channel status data and user data in a format equivalent to that of CDs and display auxiliary data such address the number and the elapsed time of each piece of music when reproducing data from a disk storing digital audio signals in a format different from that of CDs.

According to a first aspect of the invention, the above object is achieved by providing a reproduction apparatus adapted to reproduce data from a recording medium comprising a program area provided with absolute addresses and a controlled area storing the absolute start address of each of the programs stored on it in correspondence to the program number thereof, said apparatus comprising:

a reproduction means for reproducing data from the controlled area and the program area of said recording medium;

a memory means for storing the start address of each program contained in the controlled area operated by said reproduction means for data reproduction and expressed in terms of absolute address in correspondence to the program number of the program;

a comparison means for comparing the absolute address reproduced from said program area by said reproduction means with the start address of each program stored in said memory means in correspondence to the program number of the program; and a selection means for selecting the program number corresponding to the position on said program area being operated by said reproduction means for data reproduction.

According to a second aspect of the invention, there is provided a reproduction apparatus adapted to selectively reproduce data from a first recording medium having a program area collaterally storing program numbers and the passed-by addresses of each program in addition to information on the programs stored on it and a controlled area for controlling the start address of each of the programs expressed in terms of absolute address in correspondence to the program number of the program or a second recording medium having a program area storing a plurality of programs provided with absolute addresses and a controlled area for controlling the start address of each program expressed in terms of absolute address in correspondence to the program number thereof, said apparatus comprising:

a reproduction means for reproducing data from the controlled area and the program area of said selected recording medium;

a memory means for storing the start address of each program contained in the controlled area of the second recording medium operated by said reproduction means for data reproduction and expressed in terms of absolute address in correspondence to the program number of the program;

a comparison means for comparing the absolute address reproduced from said program area of said second recording medium by said reproduction means with the start address of each program stored in said memory means in correspondence to the program number of the program; and a display control means for displaying, upon selection of said first recording medium, the program number corresponding to the position on said program area being operated by said reproduction means for data reproduction on the basis of the program numbers stored collaterally in said program area and, upon selection of said second recording medium, the program number corresponding to the position on said program area being operated by said reproduction means for data reproduction on the basis of the result of comparison of said comparison means.

According to a third aspect of the invention, there is provided a reproduction apparatus adapted to selectively reproduce data from a first layer having a program area collaterally storing program numbers and the passed-by addresses of each program in addition to information on the programs stored on it and a controlled area for controlling the start address of each of the programs expressed in terms of absolute address in correspondence to the program number of the program or a second layer having a program area storing a plurality of programs provided with absolute addresses and a controlled area for controlling the start address of each program expressed in terms of absolute address in correspondence to the program number thereof, said apparatus comprising:

a reproduction means for reproducing data from the controlled area and the program area of said selected layer;

a memory means for storing the start address of each program contained in the controlled area of the second layer operated by said reproduction means for data reproduction and expressed in terms of absolute address in correspondence to the program number of the program;

a comparison means for comparing the absolute address reproduced from said program area of said second layer by said reproduction means with the start address of each program stored in said memory means in correspondence to the program number of the program; and a display control means for displaying, upon selection of said first layer, the program number corresponding to the position on said program area being operated by said reproduction means for data reproduction on the basis of the program numbers stored collaterally in said program area and, upon selection of said second layer, the program number corresponding to the position on said program area being operated by said reproduction means for data reproduction on the basis of the result of comparison of said comparison means.

Thus, according to the invention, the additional information including the track numbers and the elapsed time on each track will be detected from the disk being replayed that stores digital audio signals in a format different from that of a CD and subsequently converted into channel status data and user data equivalent to those of a CD as defined for the CD at the digital audio interface so that auxiliary information including the numbers of the pieces recorded on the disk and the elapsed time on each track may be displayed.

BRIEF DESCRIPTION OF THE DRAWINGS

FIG. 7 is a schematic illustration of the data structure of channel status data.

FIG. 8 is a schematic illustration of the data structure of user data when the category of channel status data indicates the CD category.

FIG. 9 is a schematic illustration of the data structure when a sub-frame conforming to the Digital Audio Interface Standards is used as user data.

FIG. 10 is a schematic illustration of the data structure when a sub-frame conforming to the Digital Audio Interface Standards is used as channel status data.

FIG. 12 is an illustration of the data table that may be recorded in the track list in an area TOC data.

FIG. 13 is an illustration of the data table that may be recorded in the index list in an area TOC data.

FIG. 14 is an illustration of the data table of an audio header in the audio sector of each track.

FIG. 15 is an illustration of the data table of frame info in the audio header of each track.

FIG. 16 is a specific example of table of the track list and the index list in an area TOC data.

DESCRIPTION OF THE PREFERRED EMBODIMENTS

Now, the present invention will be described by referring to the accompanying drawings that illustrate preferred embodiments of reproduction apparatus and reproduction method according to the invention.

The embodiment of reproduction apparatus according to the invention as described below is adapted to replay music from a compact disk (CD) and also from an optical disk storing high speed 1-bit digital audio signals and also display the serial number of each of the recorded pieces of music and the elapsed time from the start of the tune. An optical disk a new type storing high speed 1-bit digital audio signals will be referred to as an HD (high definition) disk hereinafter.

Each high speed 1-bit audio signal recorded on an HD disk is obtained by means of delta-sigma ($\Delta E$) modulation of an analog audio signal and has a data format of a data word length of 1-bit and a sampling frequency of 2.8224 MHz (44.1 KHz×64).

Figure 1:
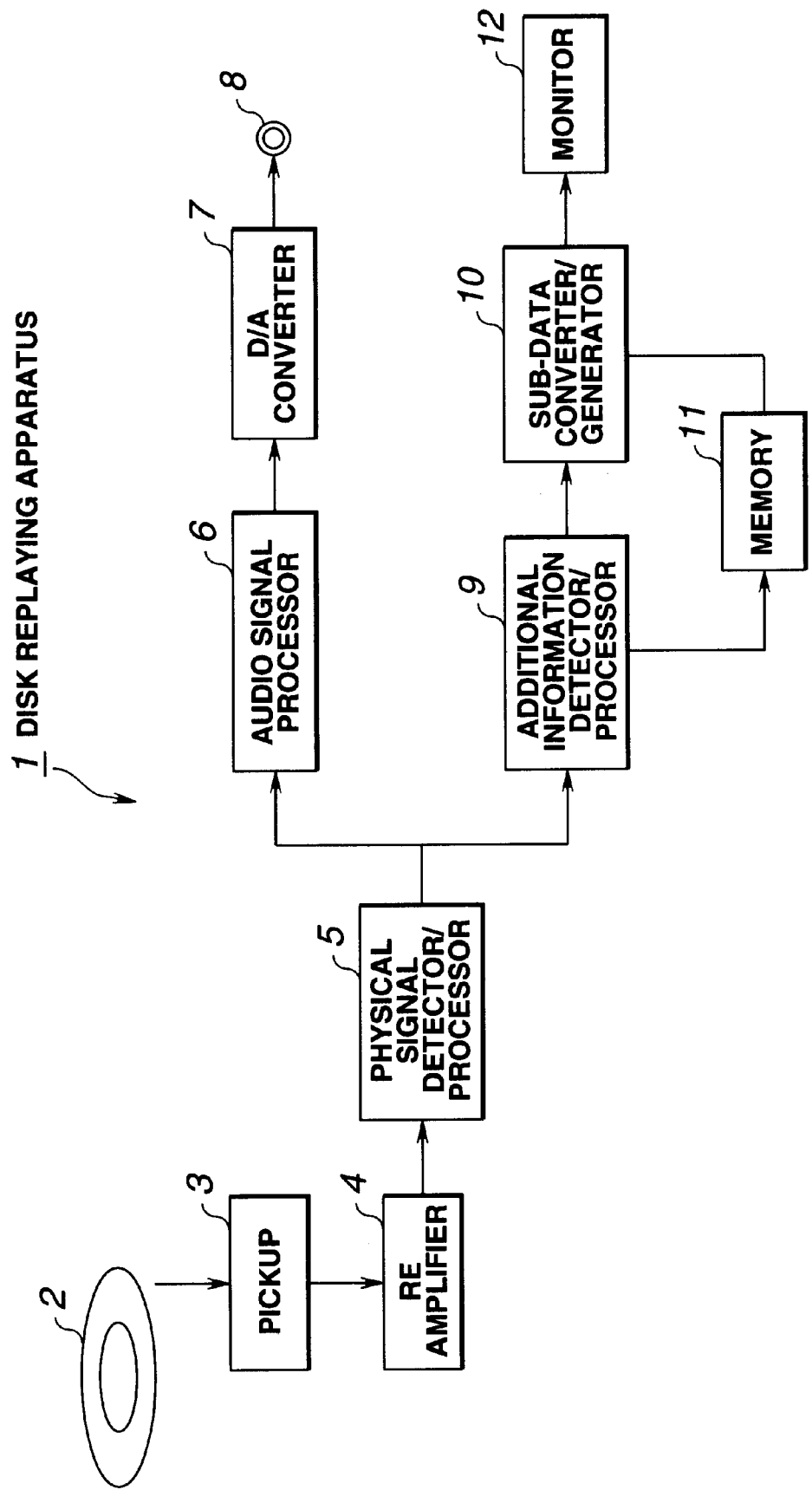
FIG. 1 is a schematic block diagram of a disk replaying apparatus embodied according to the invention.

FIG. 1 is a schematic block diagram of disk replaying apparatus 1 embodied according to the invention. The signal read out from the HD disk by means of optical pickup 3 is applied to physical signal detector/processor 5 by way of RF amplifier 4. The physical signal detector/processor 5 detects the recording pattern of the HD disk 2, carries out physically processing operations on the signal such as de-scrambling the signal and transmits the high speed 1-bit digital audio signal that is sampled with a frequency fs (64×44.1 KHz= 2.8224 MHz) as high as 64 times of the sampling frequency of ordinary CDs and sigma-delta modulated to audio signal processor 6 and additional information detector/processor 9.

The audio signal processor 6 down-converts the 1-bit digital audio signal sampled with a sampling frequency fs (64×44.1 KHz=2.8224 MHz) as high as 64 times of that of ordinary CDs and delta-sigma modulated into a 16-bit multi-data with the sampling frequency fs (Hz) and the number of quantization bits of CDs, which 16-bit multi-data is then fed to digital/analog (D/A) converter 7.

The D/A converter 7 converts the multi-bit data it receives into an analog audio signal and sends it out to the outside by way of output terminal 8.

The additional information detector/processor 9 separates all the information other than the audio signal from the data string containing said 1-bit digital audio signal. More specifically, it detects time information TCP, which will be described hereinafter, from the header information contained in said data string and transmits it to sub-data converter/generator 10. Additionally, it extracts information on the start time of each track and that of each index such as track start time codes and index start time codes from the control information arranged at the head and the trail of said data string and stores the extracted information in memory 11.

The sub-data converter/generator 10 converts and generates sub-data such as channel status data and user data that conform to the Digital Interface Standards on CDs by means of said track start time information and index start time information stored in said memory 11 and supplies monitor 12 with auxiliary information on the numbers of the pieces corresponding to the digital audio signals recorded on the optical disk 2 and the elapsed time of each track of the optical disk 2 on the basis of the converted output.

The monitor 12 displays the numbers of pieces corresponding to the digital audio signal recorded on the optical disk 2 and the elapsed time of each track of the optical disk.

Now, sub-data, or channel status data and user data conforming to the CD Standards, that can be converted and generated by the sub-data converter/generator 10 by means of the additional information extracted from the 1-bit digital audio signals from the optical disk 2 will be discussed hereinafter.

Figure 2:
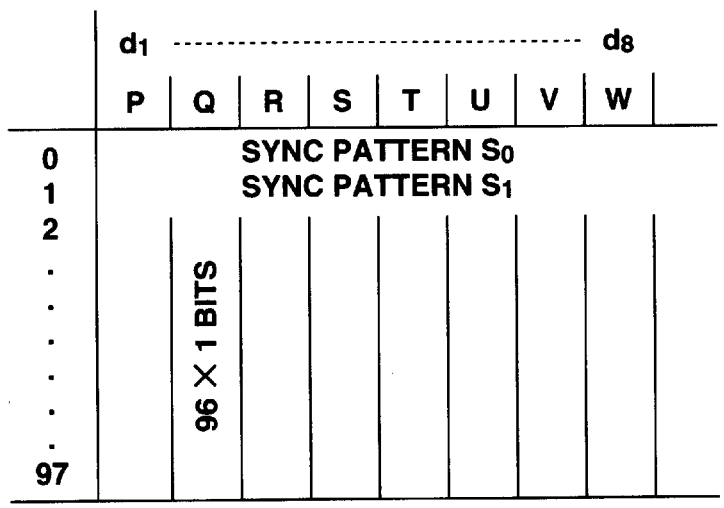
FIG. 2 is a schematic illustration of the data structure of a sub-coding frame format applicable to known CDs.

According to the CD Standards, there are sub-data (P, Q, R, S, T, U, V, W) formed on a frame by frame basis that can be read out when the disk is driven for ordinary replay on a track by track basis. FIG. 2 is a schematic illustration of the data structure of a sub-coding frame format of a compact disk audio system (conforming to the IEC (International Electro-technical Commission) 908 Standard). Sub-data P through W are contained in each frame by 98 bits including sync bits $S_0$ and $S_1$ for a sync pattern. P represents information on the interval between two pieces on a track and R through W represent information on still pictures and characters. Q represents most of the information converted and generated by the additional information detector/processor 9 including track numbers and the elapsed time on each of the tracks as well as the absolute time (minute, second, frame).

Figure 3:
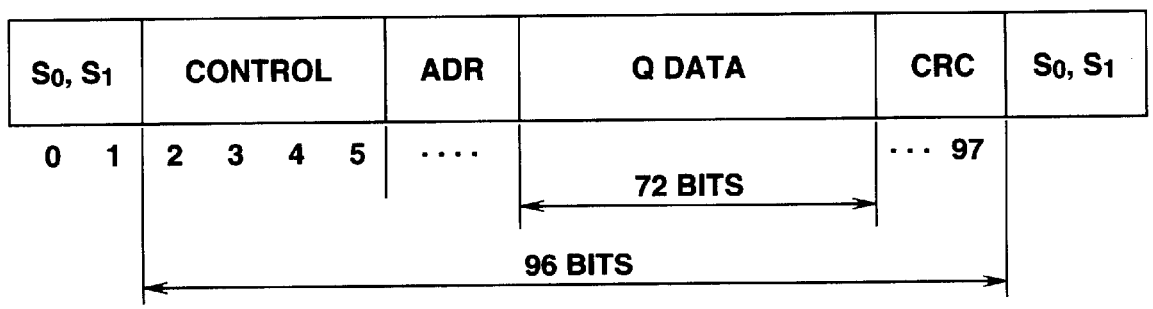
FIG. 3 is a schematic illustration of the frame data structure of a Q data applicable to known CDs.

FIG. 3 shows a format applicable to a Q code. The 96 bits other than the sync bits of $S_0$ and $S_1$. include 4 CONTROL bits indicating the presence or absence of emphasis and if copying the piece is permitted or prohibited, 4 address (ADR) bits indicating the data mode, 72 Q data bits and 16 cyclic redundancy check (CRC) bits for the generation of parity check codes. The number of address (ADR) bits will be reduced to 1 when the data in the program area are being reproduced.

Figure 4:
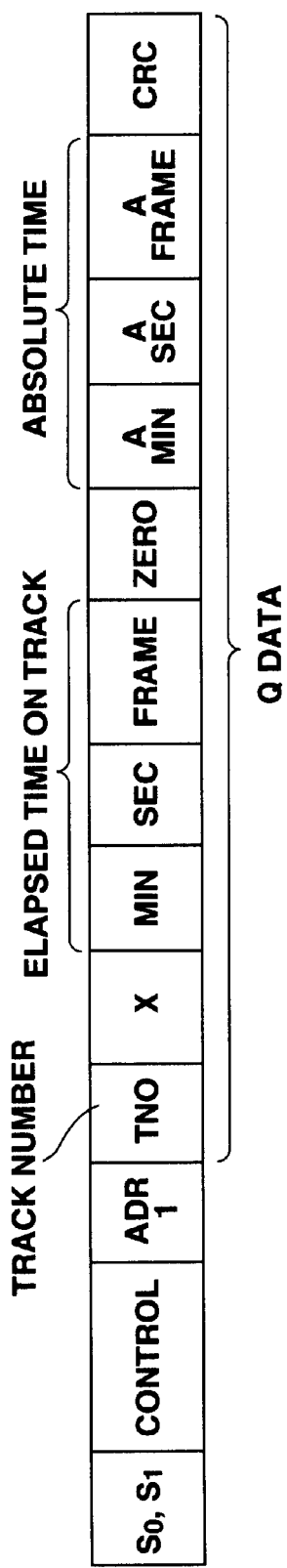
FIG. 4 a schematic illustration of the frame data structure of a Q data in a program area applicable to known CDs.

FIG. 4 is a schematic illustration of the frame data structure of a Q data including only an address (ADR) bit. It includes track no TNO, index number X, the elapsed time on the track (minute (MIN), second (SEC), frame (FRAME)), the absolute time (minute (AMIN), second (ASEC), frame (AFRAME) from the head of the disk and CRC. Note that the elapsed time on the track is that of a track with a specific track number.

Figure 5:
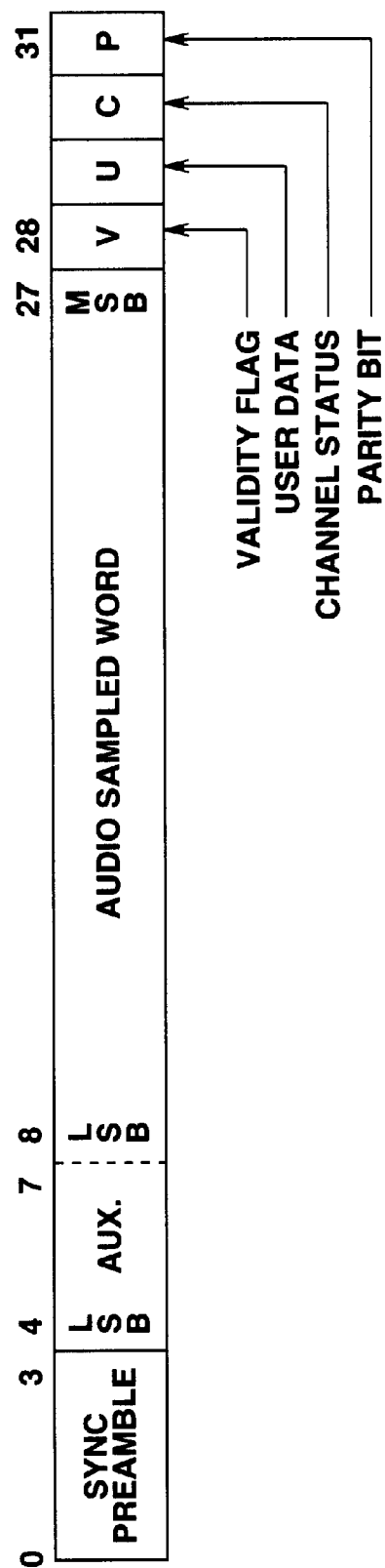
FIG. 5 is a schematic illustration of the data structure of a sub-frame conforming to the Digital Audio Interface Standards.
Figure 6:
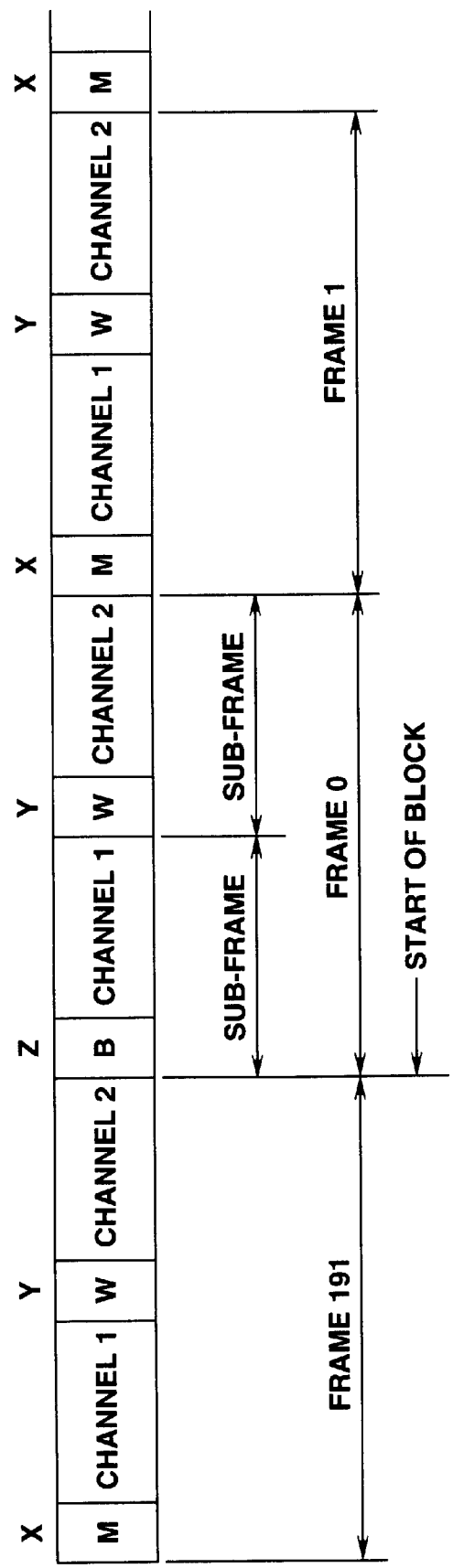
FIG. 6 is a schematic illustration of the data structure of a frame conforming to the Digital Audio Interface Standards.

FIG. 5 is a schematic illustration of the data format of a sub-frame conforming to the Digital Audio Interface Standards (IEC 958 Standards). FIG. 6 is a schematic illustration of the data structure of a frame containing sub-frames as shown in FIG. physical signal detector/processor 5 and conforming to the Digital Audio Interface Standards (IEC 958 Standards). A block is formed by 192 frames, each comprising two sub-frames.

The sync preamble, user data (U bit), channel status data (C bit) and other data exist in each frame in addition to audio data for the left and right channels.

FIG. 7 is a schematic illustration of the data format of channel status data. The data contains a category code for identifying the type of apparatus, the sampling frequency fs and CONTROL bits for indicating the presence or absence of emphasis.

FIG. 8 is a schematic illustration of the data format of a user data when the category code of FIG. 7 is "10000000", indicating that the signal source is a CD reproduction apparatus. Here, codes Q through W are listed to exclude P code and, particularly, the 96 bits Q code will be extracted therefrom.

FIG. 9 and FIG. 10 show examples of data including user data (U) and channel status data (C) that can be actually output along with audio data.

Thus, as described above, a digital output of a CD player contains channel status data indicating the CD category and user data indicating the track number and the elapsed time of the track.

On the other hand, according to the above described newly established standards for optical disks, a start address that corresponds to the absolute time of the start of a track in the audio area is written in Track__List__2 in the area TOC data. Only the time code contained in the initial header of each audio sector that corresponds to the absolute time of the start can be read out during an ordinary operation of reproducing data from a track.

Figures 11A, 11B, 11C, 11D:
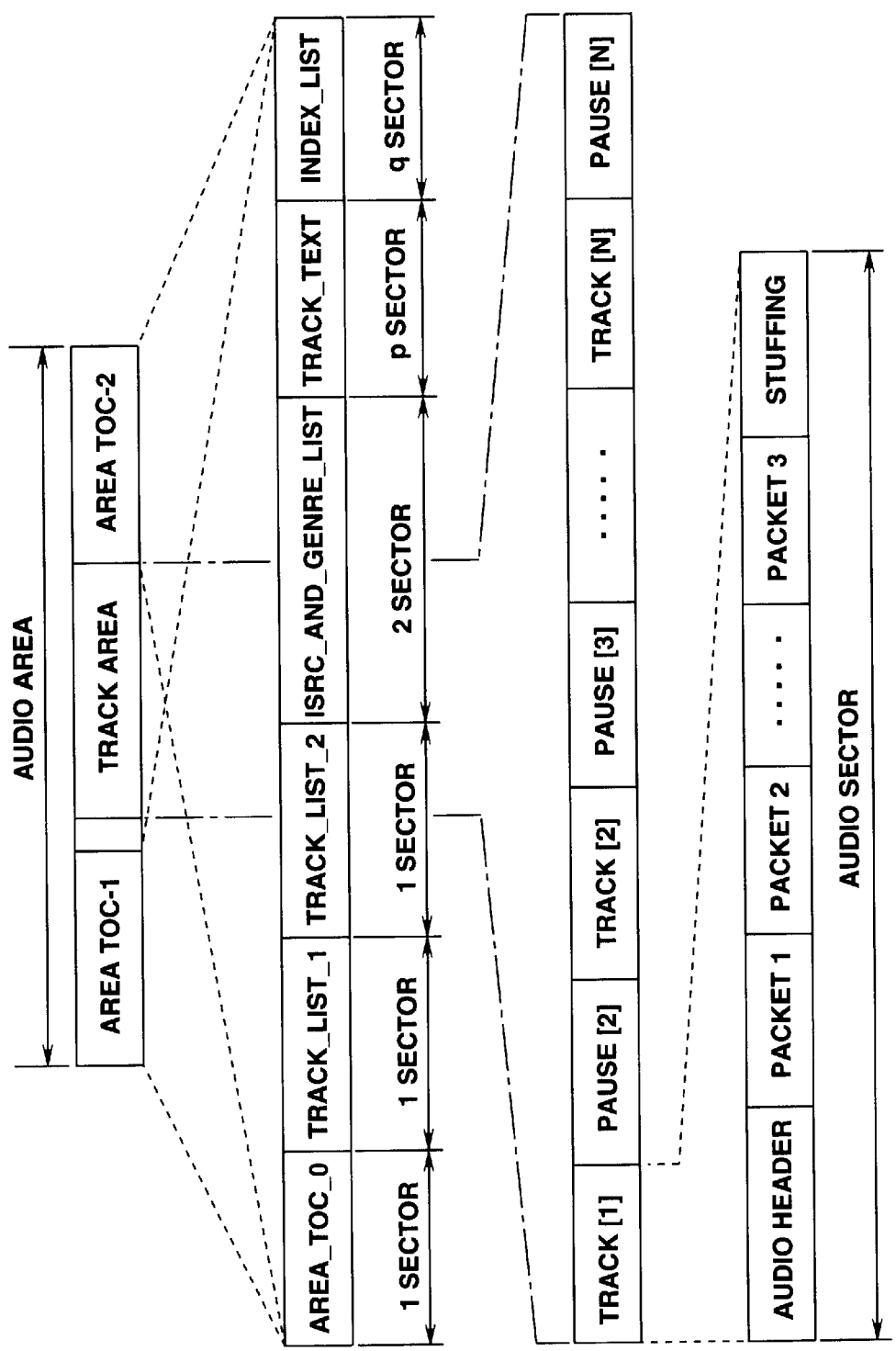
FIG. 11A is a schematic illustration of the data structure of an HD disk applicable to the present invention.
FIG. 11B is a detailed illustration of the data structure of area TOC shown in FIG. 11A.
FIG. 11C is a detailed illustration of the data structure of the track area shown in FIG. 11A.
FIG. 11D is a detailed illustration of the data structure of each track of the track area shown in FIG. 11A.

FIG. 11A is a schematic illustration of the data structure of the audio area on an optical disk conforming to the Standards, where each of the two area TOCs arranged on the opposite sides of the track area has a configuration as shown in FIG. 11B. Track__Start__Time__Code of each track is described in Track__List__2 in the area TOC as shown in the syntax of FIG. 12. Index start time code Index__Start__TC of each index number as shown in the syntax of FIG. 13 is described in Index__List of FIG. 11B.

On the other hand, Audio Sector as shown in FIG. 11D is provided on each track as shown in FIG. 11C in the track area of FIG. 11A and Frame__Info as shown in the syntax of FIG. 14 is described in Audio Header in the Audio Sector. More specifically, Time__Code of each frame is described there as shown in FIG. 15.

As described above, according to the HD standards, only the time code (absolute time) of each frame can be read out from a track area that is a program area during an ordinary operation of reproducing data from a track unlike the CD format. In other words, information such as track numbers and the elapsed time of each track is not recorded. Therefore, it is not possible to display track numbers and the elapsed time of each track.

In order to overcome this inconvenience, the disk replaying apparatus 1 firstly reads out area TOC (Table of Contents) data and stores it in memory 8 as shown in FIG. 1 when a disk is placed in position. Thus, the memory 8 stores a table of TRACK LIST 2 and INDEX LIST as shown in FIG. 16.

Figure 17:
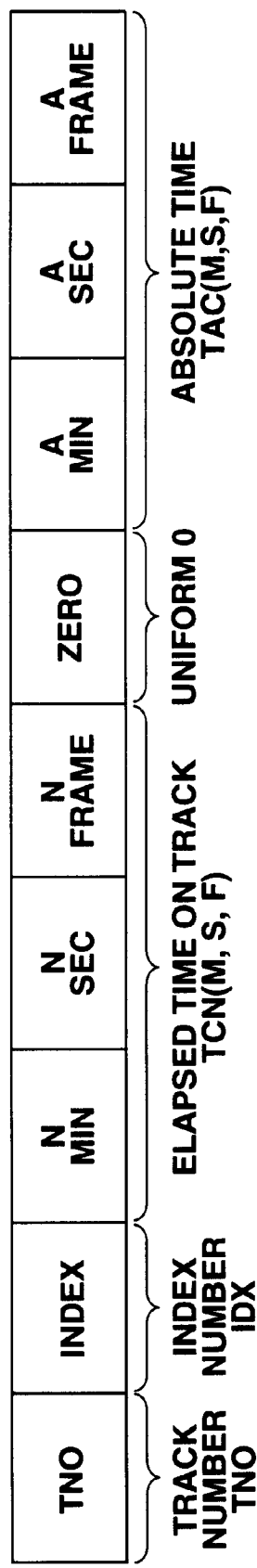
FIG. 17 schematic illustration of the data structure of a sub-Q-data.

For driving the optical disk 2 for data reproduction and adding user data U bit) to its digital output, Q data as shown in FIG. 17 has to be produced by additional information detector/processor 9 through a data conversion/generation process.

Now, a conversion processing operation of a sub-data will be described by referring to FIG. 18. Firstly, the time code (absolute time) of the audio header has to be read out as TCP for each frame while the optical disk 2 is driven for data reproduction. Then, in Step S1, the absolute time TCA (minute M, second S, frame F) of the TCP is written as shown in FIG. 17.

Then, in Step S2, Track_Start_Time_Code (TC2) of Track No. 2 (TNO. 2) is compared with the above TCP. If TCP is smaller than TC2, the operation proceeds to Step S3, where the current track number is specified as TNO. 1. In Step S4, TC1 of Track Number 1 (TNO. 1) is subtracted from the TCP to produce elapsed time TCN (minute, second, frame).

Figure 18:
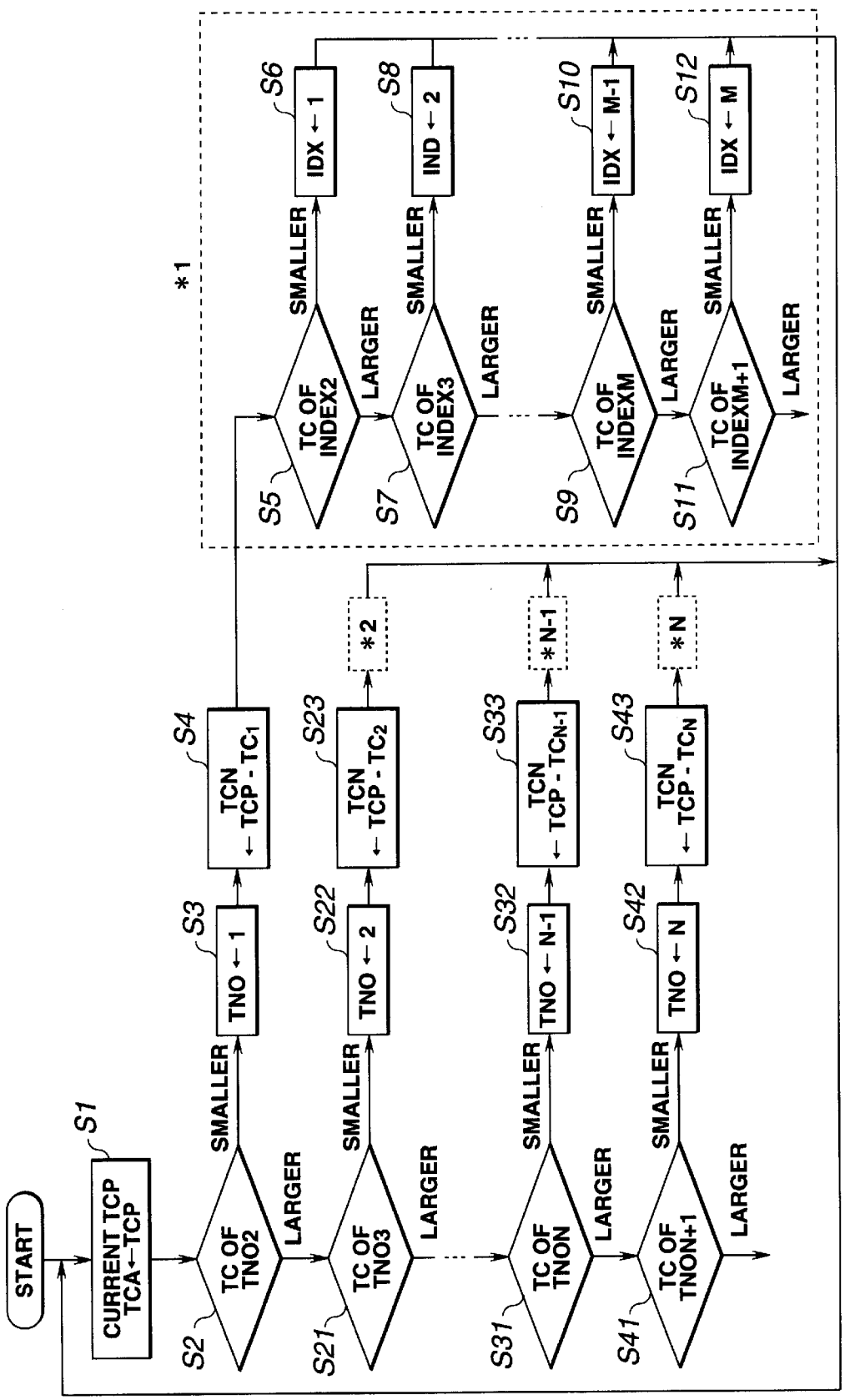
FIG. 18 is a flow chart of the operation of generating track numbers, index numbers and elapsed time that can be used for the purpose of the invention.

After Step S4, the operation proceeds to the processing sequence of *1 surrounded by broken lines in FIG. 18, where the index number (IDX) in the track number TNO. 1 is determined.

In Step S5, Index_Start_TC of INDEX 2 of the track number TNO. 1 in Index_List is compared with the above TCP. If the above TCP is smaller than Index_Start_TC of INDEX 2, the operation proceeds to Step S6, where the index number is determined to be equal to "1". If, on the other hand, it is found in Step S5 that the above TCP is greater than Index_Start_TC of INDEX 2, the operation proceeds to Step S7, where Index_Start_TC of INDEX 3 of the track number TNO. 1 is compared with the above TCP. If the above TCP is smaller than Index_Start_TC of INDEX 3, the operation proceeds to Step S8, where the index number is determined to be equal to "2". If, on the other hand, it is found in Step S7 that the above TCP is greater than Index_Start_TC of INDEX 3, the operation proceeds to Step S9, where idex_Start_TC of INDEXM of the track number TNO. 1 is compared with the above TCP. If the above TCP is smaller than Index_Start_TC of INDEXM, the operation proceeds to Step S10, where the index number is determined to be equal to "M–1". If, on the other hand, it is found in Step S9 that the above TCP is greater than Index_Start_TC of INDEXM, the operation proceeds to Step S11, where Index_Start_TC of INDEXM of the track number TNO. 1 is compared with the above TCP. If the above TCP is smaller than Index_Start_TC of INDEXM+1, the operation proceeds to Step S12, where the index number is determined to be equal to "M".

Then, the operation returns to Step S2 and if it is found in Step S2 that the above TCP is greater than the above TC2, the operation proceeds to Step S2, where Track_Start_ Time_Code (TC3) of Track Number 3 (TNO. 3) is compared with the above TCP. If the above TCP is smaller than TC3, the operation proceeds to Step S22, where the current track number TNO. is determined to be equal to "2". Then, in Step S23, TC2 of the track number TNO. 2 is subtracted from TCP to obtain the elapsed time TCN (minute, second, frame).

After the above Step S23, the operation proceeds to the processing sequence of *2 surrounded by broken lines, where the index number (IDX) in the track number TNO. 2 is determined. Since this sequence is similar to that of *1 above, it will not be described here any further.

Then, in Step S31, if the above TCP is smaller than TCN of the tack number N (TNO. N), the operation proceeds to Step S32, where the current track number TNO. is determined to be equal to N–1. In Step S33, TC(N–1) of the track number TNO. (N–1) is subtracted from TCP to obtain the elapsed time TCN (minute, second, frame).

After the above Step S33, the operation proceeds to the processing sequence of *N–1 surrounded by broken lines, where the index number (IDX) in the track number TNO. N–1 is determined. Since this sequence is similar to that of *1 above, it will not be described here any further.

If it is found in Step S31 that the above TCP is greater than the N-th TCN of the track number TNO, the operation proceeds to Step S41, where Track_Start_Time_Code (TCN+1) of the track number N+1 (TNO. N+1) is compared with the above TCP. If it is found that TCP is smaller than TCN+1, the operation proceeds to Step S42, where the current track number TNO is determined to be equal to "N". Then, in Step S43, TCN of the track number N (TCN. N) is subtracted from TCP to obtain the elapsed time TCN (minute, second, frame).

After the above Step S43, the operation proceeds to the processing sequence of *N surrounded by broken lines, where the index number (IDX) in the track number TNO. N is determined. Since this sequence is similar to that of *1 above, it will not be described here any further.

Then, in the disk replaying apparatus 1, the sub-data converter/generator 10 turns TCP into absolute time TCA, using TCP read out by the additional information detector/processor 9 and the table stored in the memory 8 as shown in FIG. 16. Thereafter, the disk replaying apparatus 1 compares the track start time code of each track with TCP, starting from the track number TNO. 2. TNO that is greater than the N-th TC of the track number TNO and smaller than the N+1-th TC will be equal to N. The value obtained by subtracting the N-th TC of TNO from TCP represents the elapsed time TCN (minute, second, frame). Then, each index start time code of TNO. N in the index list is compared with TCP to determine the current index number (IDX). Thus, Q data as shown in FIG. 17 can be prepared with the above described flow of operation of conversion/generation. Then, fixed value data such as CONTROL and address ADA shown in FIG. 4 are added thereto to produce complete Q data.

If the current absolute time is 7 minute, 40 second, 33 frame in the list of area TOC shown in FIG. 16, then the track number TNO will be "2" and the elapsed time TCN will be 2 minute, 10 second, frame 33, whereas IDX will be "2".

Figure 19:
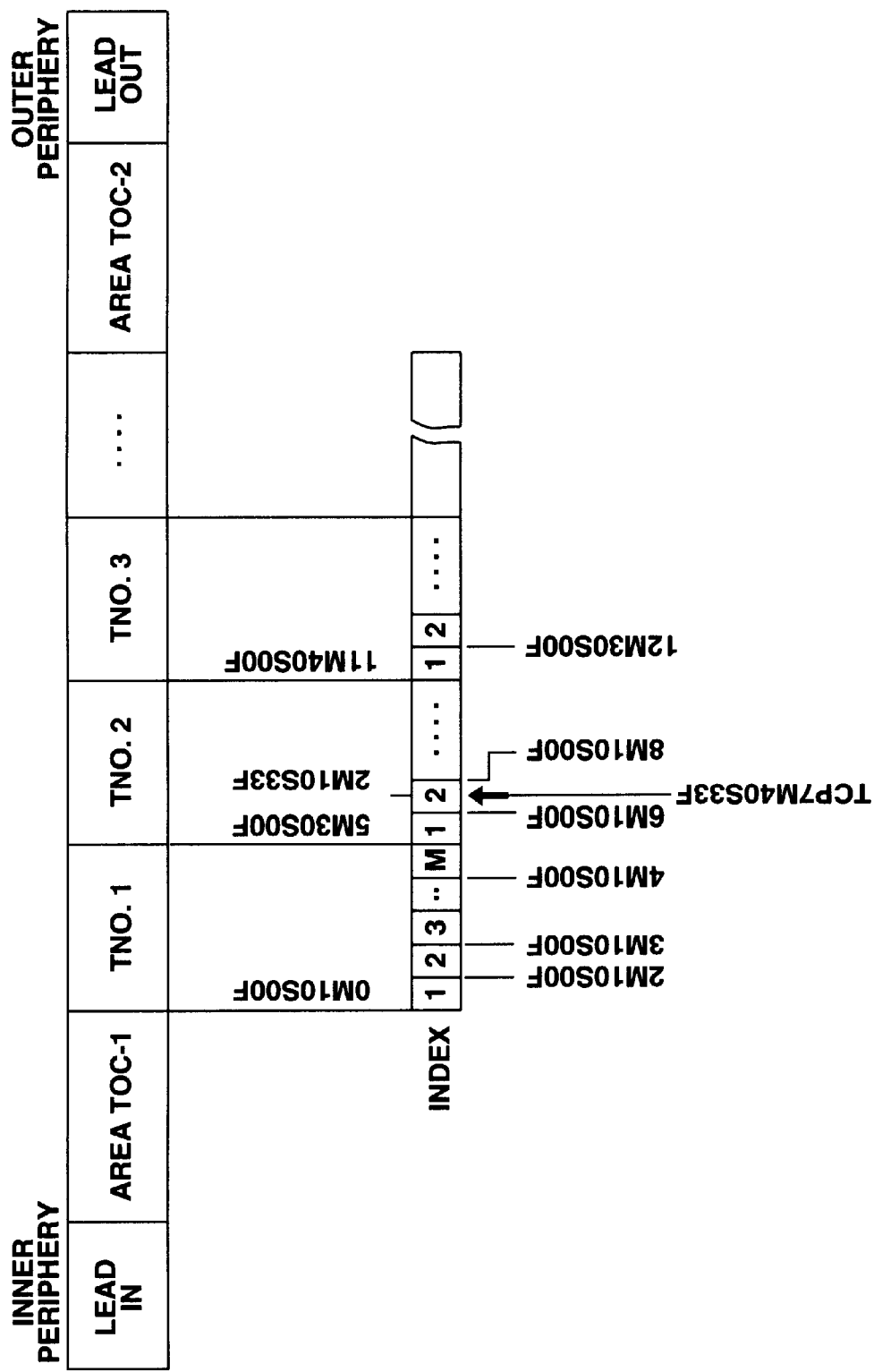
FIG. 19 is a schematic illustration of the data structure indicating track numbers, index numbers and start times that can be actually generated on the basis of the table of FIG. 16.

Now, the operation of the above embodiment will be described further by referring to the flow chart of FIG. 18 and also to FIG. 19.

Firstly, TCP "7 minute, 40 second, 33 frame" as read out by the additional information detector/processor 9 is written into TCA of FIG. 17. Then, Track_Start_Time_Code (TC2) "5 minute, 30 second, 00 frame" of the track with the track number 2 (TNO. 2) is compared with the above TCP. Since TCP is greater than TC2, the operation proceeds to Step S21, where Track_Start_Time_Code (TC3) "11 minute, 40 second, 00 frame" of the track with the track number 3 (TNO. 3) is compared with the above TCP. Since TCP is smaller than TC3, the operation proceeds to Step S22, where the track number TNO is made equal to "2". Then, in Step S23, TC2 is subtracted from TCP to obtain 2 minutes, 10 seconds, 33 frames as TCN, or the elapsed time of the track number 2.

Also, "6 minute, 10 second, 00 frame" of INDEX 2 is compared with the above TCP and, since TCP is greater of the two, TC "8 minute, 10 second, 00 frame" of INDEX 3 is compared with the above TCP. Since TCP is smaller of the two, the index number will be made equal to "2".

Then, the number of piece (track number) and the elapsed time on the track are displayed on the monitor 12 for the digital signal of the optical disk 2.

Thus, to convert the additional information read out from the optical disk 2 by means of the optical pickup 3 of the disk replaying apparatus 1 into data corresponding to Q code of the sub-data of a CD, the data of the area TOC is read out by the additional information detector/processor 9 firstly when the disk is placed in position and stored in the memory 8. For an ordinary track replaying operation, the time code in the header is read out by the additional information detector/processor 9 and converted into channel status data and user data Q code by the user data converter/generator 10, referring to the information on the track list in the area TOC data stored i the memory 8.

For example, the value obtained by subtracting the start address of the N-th address in the track list from the time code address being reproduced will correspond to the elapsed time on the track.

Note that channel status data is more often than not uniquely defined by the category and the parameters of the equipment to be used. For example, channel status data can be generated for a new optical disk by fixing the category code to CD, the sampling frequency to 44.1 KHz and the emphasis to off.

With the above described method, the additional information of a new optical disk can be converted into channel status data and user data equivalent to those of a CD so that the auxiliary information recorded on the disk such as the numbers of the pieces and the elapsed time on each track can be displayed.

While the above described disk replaying apparatus 1 is adapted to reproduce data from a CD or an HD, the present invention may also be applied to an apparatus adapted to replay a hybrid disk comprising a CD signal area and a 1-bit digital signal area arranged to show a multilayer configuration. In either case, the numbers of pieces and the elapsed time on each track relating to the audio signal reproduced from the CD layer or the 1-bit digital signal layer can be displayed on the monitor 12.

What is claimed is:

1. A reproduction apparatus for reproducing data from a recording medium having a program area provided with only absolute addresses and a controlled area storing a start address of each program stored on the recording medium in correspondence to a program number thereof, said apparatus comprising:

reproduction means for reproducing data from the controlled area and from the program area of said recording medium;

memory means for storing the start address of each program contained in the controlled area operated by said reproduction means for data reproduction and expressed in terms of absolute address in correspondence to the program number of the respective program;

comparison means for comparing a present absolute address reproduced from said program area by said reproduction means with the start address of each program stored in said memory means in correspondence to the program number of the program; and selection means for selecting the program number corresponding to the position on said program area being operated by said reproduction means for data reproduction in accordance with a comparison result of said comparison means.

2. The reproduction apparatus according to claim 1, further comprising display means for displaying the program number selected by said selection means.

3. The reproduction apparatus according to claim 1, wherein the controlled area of said recording medium further stores index numbers for dividing a single program into a plurality of parts and start addresses expressed in terms of absolute addresses corresponding to said index numbers;

said apparatus further comprising:

second memory means for storing the start addresses expressed in terms of absolute addresses corresponding to said index numbers used to divide a single program contained in said controlled area and reproduced by said reproduction means;

second comparison means for comparing the absolute address reproduced from said program area by said reproduction means with the start address stored in said second memory means in correspondence to the related index number; and second selection means for selecting the index number corresponding to the position on said program area being replayed by said reproduction means on the basis of the result of comparison by said second comparison means.

4. The reproduction apparatus according to claim 3, further comprising display means for displaying the index number selected by said second selection means.

5. The reproduction apparatus according to claim 1, wherein the data stored in said program area are sigma-delta modulated 1-bit digital signals.

6. The reproduction apparatus according to claim 1, further comprising:

arithmetic means for computationally determining an elapsed time of the program being reproduced by said reproduction means on the basis of the absolute address reproduced from said program area by said reproduction means and the start address of the program corresponding to the program number stored in said memory means; and display means for displaying the elapsed time of the program as computationally determined by said arithmetic means.

7. A reproduction apparatus for selectively reproducing data from a first recording medium having a program area collaterally storing program numbers, passed-by addresses of each program, and information on programs stored on the first recording medium, and a controlled area for controlling a start address of each program expressed in terms of absolute address in correspondence to the program number of the program or to reproduce data from a second recording medium having a program area storing a plurality of programs provided with only absolute addresses and a controlled area for controlling the start address of each program expressed in terms of absolute address in correspondence to the program number thereof, said apparatus comprising:

reproduction means for reproducing data from the controlled area and from the program area of a selected one of said first recording medium or said second recording medium;

memory means for storing the start address of each program contained in the controlled area of the second recording medium operated by said reproduction means for data reproduction and expressed in terms of absolute address in correspondence to the program number of the program;

comparison means for comparing a present address reproduced from said program area of said second recording medium by said reproduction means with the start address of each program stored in said memory means in correspondence to the program number of the program; and display control means for displaying, upon selection of said first recording medium, the program number corresponding to a position on said program area being operated by said reproduction means for data reproduction on the basis of the program numbers stored collaterally in said program area and, upon selection of said second recording medium, for displaying the program number corresponding to a position on said program area being operated by said reproduction means for data reproduction in accordance with a comparison result of said comparison means.

8. The reproduction apparatus according to claim 7, wherein said first recording medium stores digital audio signals of m quantization bits (m≧integer of 2) with a sampling frequency of Fs (Hz).

9. The reproduction apparatus according to claim 8, wherein said second recording medium stores digital audio signals of 1 quantization bit with a sampling frequency of n×Fs (Hz) (m≧integer of 2).

10. The reproduction apparatus according to claim 7, wherein, when said first recording medium is selected, an elapsed time corresponding to said program area being reproduced by said reproduction means is displayed on the basis of the passed-by addresses of the program stored collaterally in the program area of said first recording medium.

11. The reproduction apparatus according to claim 7, further comprising arithmetic means for computationally determining, when said second recording medium is selected, an elapsed time corresponding to the program being reproduced by said reproduction means on the basis of the absolute address reproduced by said reproduction means from the program area of said second memory means and the start address of the program corresponding to the program number stored in said memory means, wherein the elapsed time of the program as computationally determined by said arithmetic means is displayed by said display control means.

12. The reproduction apparatus according to claim 7, wherein the controlled area of said second recording medium further stores index numbers for dividing a single program into a plurality of parts and start addresses expressed in terms of absolute addresses corresponding to said index numbers, said apparatus further comprising:

second memory means for storing the start addresses expressed in terms of absolute addresses corresponding to said index numbers used to divide a single program contained in said controlled area of said second recording medium and reproduced by said reproduction means; and second comparison means for comparing the absolute address reproduced from said program area of said second recording medium by said reproduction means with the start address stored in said second memory means in correspondence to the related index number, wherein the index number corresponds to a position in the program area of said second recording medium being reproduced by said reproduction means and displayed by said display control means on the basis of the result of comparison by said second comparison means.

13. A reproduction apparatus for selectively reproducing data from a first layer having a program area collaterally storing program numbers, passed-by addresses of each program, and information on programs stored on the first layer, and a controlled area for controlling a start address of each program expressed in terms of absolute address in correspondence to the program number of the program or reproducing data from a second layer having a program area storing a plurality of programs provided with only absolute addresses and a controlled area for controlling the start address of each program expressed in terms of absolute address in correspondence to the program number thereof, said apparatus comprising:

reproduction means for reproducing data from the controlled area and from the program area of a selected one of the first layer or the second layer;

memory means for storing the start address of each program contained in the controlled area of the second layer operated by said reproduction means for data reproduction and expressed in terms of absolute address in correspondence to the program number of the program;

comparison means for comparing a present address reproduced from said program area of said second layer by said reproduction means with the start address of each program stored in said memory means in correspondence to the program number of the program; and display control means for displaying, upon selection of said first layer, the program number corresponding to a position on said program area being operated by said reproduction means for data reproduction on the basis of the program numbers stored collaterally in said program area and, upon selection of said second layer, for displaying the program number corresponding to the position on said program area being operated by said reproduction means for data reproduction in accordance with a comparison result of said comparison means.

14. A reproduction method for reproducing data from a recording medium having a program area provided with only absolute addresses and a controlled area storing an absolute start address of each program stored on the recording medium in correspondence to the program number thereof, said method comprising the steps of:

reproducing data of the start address of each program stored on the recording medium from the controlled area of said recording medium;

storing the start address expressed in terms of absolute address of each program contained in the controlled area being reproduced in correspondence to the program number;

reproducing data of the absolute addresses from said program area;

comparing a present absolute address reproduced from said program area with the start address of each program corresponding to the program number stored in said step of storing; and displaying the program number corresponding too the program being reproduced in accordance with a comparison result in said step of comparing.

* * * * *